United States Patent [19]

Okada et al.

[11] Patent Number: 5,291,104
[45] Date of Patent: Mar. 1, 1994

[54] DC COMMUTATORLESS MOTOR

[75] Inventors: Yasuhiro Okada; Tadashi Itami, both of Yonago; Yasutaka Tsukiyama, Hirakata, all of Japan

[73] Assignee: Matsushita Electric Industrial Co., Ltd., Osaka, Japan

[21] Appl. No.: 865,703

[22] Filed: Apr. 8, 1992

Related U.S. Application Data

[63] Continuation of Ser. No. 475,771, Feb. 6, 1990, abandoned.

[30] Foreign Application Priority Data

Feb. 8, 1989 [JP] Japan .................................. 1-29117

[51] Int. Cl.⁵ .................................................. H02P 5/06
[52] U.S. Cl. .................................... 318/254; 318/439; 310/268; 310/68 B
[58] Field of Search ........ 318/138, 439, 254, 600-602, 318/604-605; 310/152-154, 177, 179-181, 156, 268, 68 R, 68 B, 261

[56] References Cited

U.S. PATENT DOCUMENTS

| | | | |
|---|---|---|---|
| 4,006,375 | 2/1977 | Lyman, Jr. et al. | 310/268 |
| 4,568,847 | 2/1986 | Schmider | 310/68 R |
| 4,743,815 | 5/1988 | Gee et al. | 318/138 |
| 4,918,346 | 4/1990 | Tajima et al. | 310/156 |
| 4,961,017 | 10/1990 | Kakinoki et al. | 310/68 B |
| 5,036,239 | 7/1971 | Yamaguchi | 310/268 |
| 5,099,162 | 3/1992 | Sanada | 310/268 X |
| 5,189,323 | 2/1993 | Carr et al. | 310/268 |

Primary Examiner—William M. Shoop, Jr.
Assistant Examiner—David Martin
Attorney, Agent, or Firm—Ratner & Prestia

[57] ABSTRACT

A DC commutatorless motor in which one pulse is generated per one revolution is disclosed. The motor comprises: three-phase stator windings; a rotor having 2n magnetic poles (where n is a natural number of 2 or more), a portion of one of the magnetic poles having a magnetic property different from that of said one magnetic pole; three detection devices disposed in the vicinity of said rotor, the detection devices being responsive to a magnetic field generated by the magnetic poles and the portion; first to third amplifiers for amplifying respectively the outputs of the three detection devices; first to third subtracting circuits for obtaining respectively the difference of the outputs of two of the first to third amplifiers; an adding circuit for adding the outputs of the first to third subtracting circuits; and a signal circuit for generating a pulse per one revolution of he rotor on the basis of the output of the adding circuit.

14 Claims, 6 Drawing Sheets

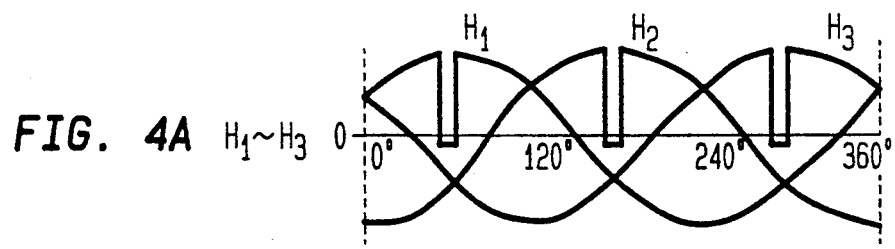
FIG. 4A  $H_1 \sim H_3$
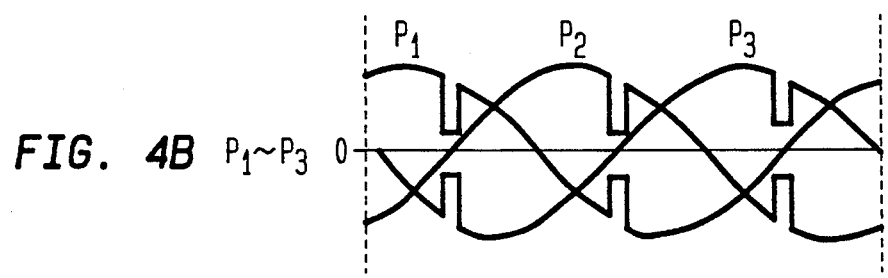
FIG. 4B  $P_1 \sim P_3$
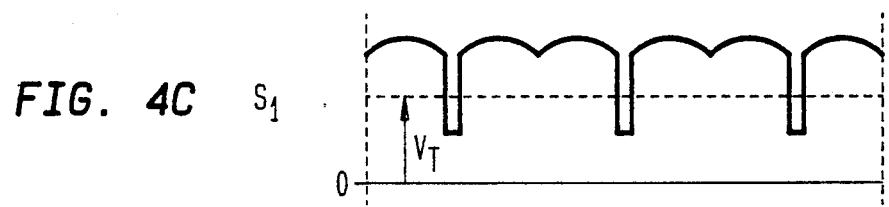
FIG. 4C  $S_1$
FIG. 4D  $P_Z$
FIG. 4E  PG
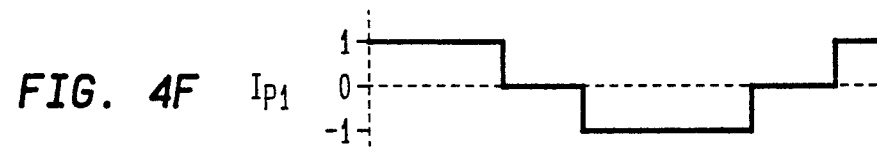
FIG. 4F  $I_{P1}$
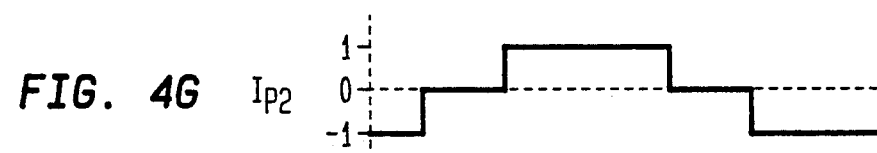
FIG. 4G  $I_{P2}$
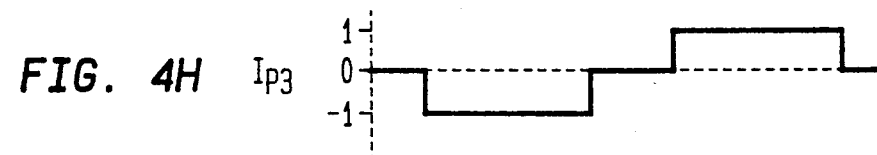
FIG. 4H  $I_{P3}$

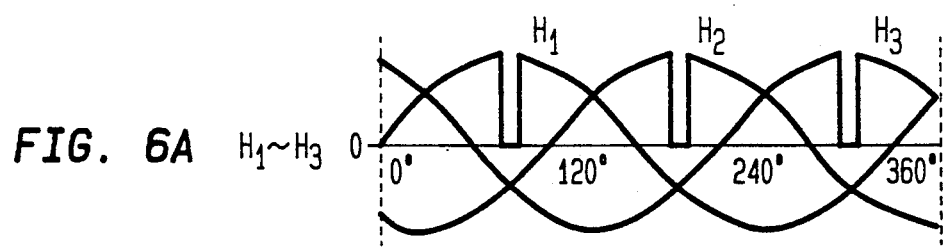
FIG. 6A  H₁~H₃
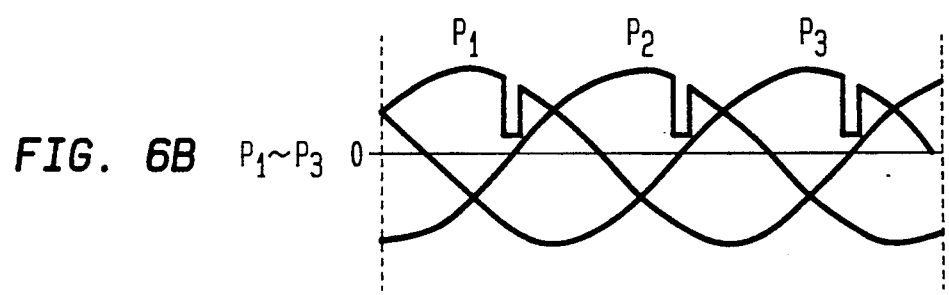
FIG. 6B  P₁~P₃
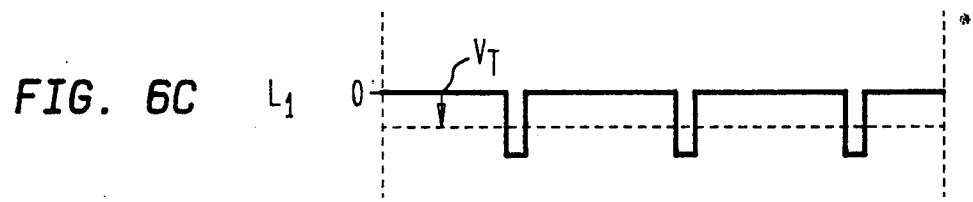
FIG. 6C  L₁
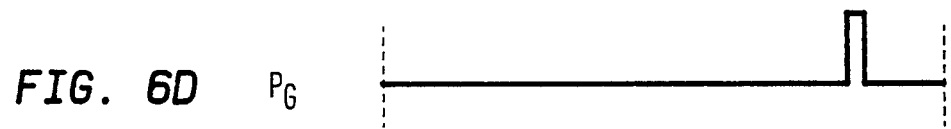
FIG. 6D  P_G
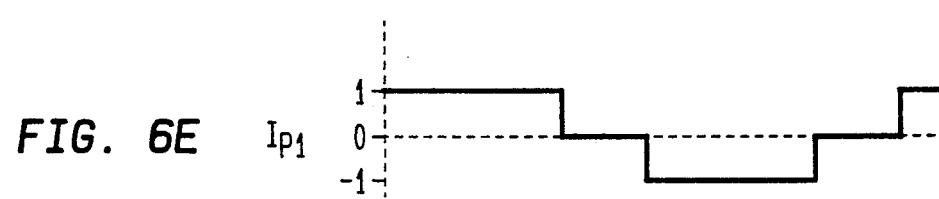
FIG. 6E  I_{P1}
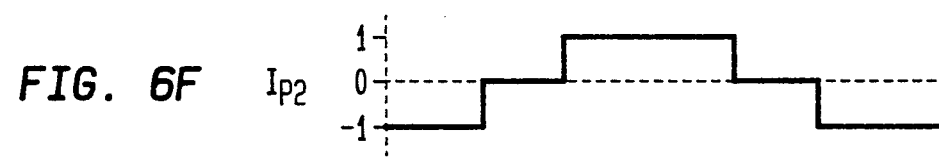
FIG. 6F  I_{P2}
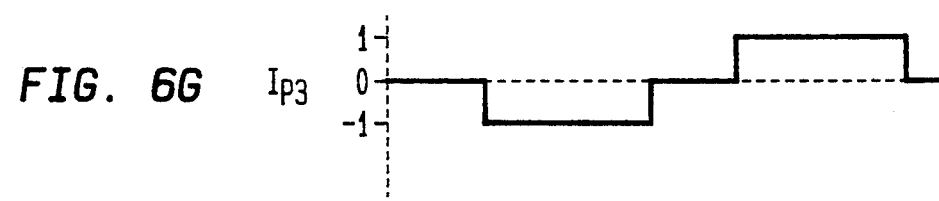
FIG. 6G  I_{P3}

DC COMMUTATORLESS MOTOR

This application is a continuation of application Ser. No. 07/475,771 filed Feb. 6, 1990, now abandoned.

BACKGROUND OF THE INVENTION

1. Field of the Invention

This invention relates to a DC commutatorless motor, and more particularly to a DC commutatorless motor which is useful as a motor for driving a cylinder-drum of a video tape recorder (VTR) or a spindle motor of a floppy disk drive apparatus.

2. Description of the Prior Art

In recent years, DC commutatorless motors are widely used in VTRs and floppy disk apparatuses. When used for driving a cylinder drum in a VTR, such a motor is required to generate a signal having one pulse for every rotation of the rotor coupled to the cylinder drum, so that the rotating position of a rotary magnetic head of the drum can be detected. Hereinafter, such a signal is referred to as "a PG signal". When used as a spindle motor of a driving unit of a floppy disk, such a motor is also required to generate one PG signal (in this case, called an index pulse) for every rotation, thereby defining a write start position of a floppy disk.

FIG. 7 shows a conventional DC commutatorless motor comprising means for generating a PG signal. The motor of FIG. 7 includes a rotor 51 and a stator 52. The rotor 51 comprises a rotor yoke 34, rotor magnets 40 fixed to the rotor yoke 34, and a PG magnet 41 fastened on the periphery of the rotor yoke 34. The stator 52 comprises a stator plate 37, stator windings 35 disposed on the stator plate 37, a stator base 36, a bearing boss 43, and a bearing 39 mounted to the bearing boss 43. A Hall IC 42 is mounted to the stator plate 37 so as to oppose the PG magnet 41, and rotation detecting elements 44 are disposed on the stator plate 37 so as to face the rotor magnets 40. A shaft 38 is attached to the bearing 39. The rotor yoke 34 is fixed to the shaft 38 to rotate thereabout. In the motor having this structure, the Hall IC 42 detects a magnetic flux generated by the PG magnet 41 to produce a PG signal for every rotation of the rotor. The rotation detecting elements 44 detect the rotation of the rotor yoke 34, thereby enabling the control of driving the motor. The rotation detecting elements 44 may be Hall ICs.

In a conventional DC commutatorless motor having a structure as described above, the PG magnet 41 is fixed to the rotor yoke 34 by means of an adhesive agent or the like, thereby increasing the production steps and also the number of components. Moreover, the use of the Hall IC 42 and the magnet 41 for activating the Hall IC causes a considerable rise of the material cost and a further increase of the production steps. Since a usual ferrite magnet cannot generate a magnetic flux sufficient for activating the Hall IC 42, it is necessary to use a rare-earth magnet, which is expensive, as the PG magnet 41 so that a magnetic flux sufficient for activating the Hall IC 42 can be generated, resulting in a further rise of the material cost.

SUMMARY OF THE INVENTION

The DC commutatorless motor of this invention, which overcomes the above-discussed and numerous other disadvantages and deficiencies of the prior art, comprises three-phase stator windings; a rotor having magnetic poles, the number of said magnetic poles being 2n (where n is a natural number of 2 or more), a portion of one of said magnetic poles having a magnetic property different from that of said one magnetic pole; three detection devices disposed in the vicinity of said rotor, said detection devices being responsive to a magnetic field generated by said magnetic poles and said portion; first to third amplifying means for amplifying respectively the outputs of said three detection devices; first to third subtracting means for obtaining respectively the difference of the outputs of two of said first to third amplifying means; an adding means for adding the outputs of said first to third subtracting means; and a signal means for generating a pulse per one revolution of said rotor on the basis of the output of said adding means.

In a preferred embodiment, the signal means comprise a comparing means for comparing the output level of said adding means with a predetermined reference level.

In a preferred embodiment, said portion has the polarity opposite to that of said one magnetic pole.

In a preferred embodiment, said portion is not magnetized.

In a preferred embodiment, the detection devices are separated from each other by an electrical angle of 120 deg.

In a preferred embodiment, the motor further comprises a driving current means for amplifying the outputs of said first to third subtracting means and supplying the amplified outputs to said stator windings.

The DC commutatorless motor comprises three-phase stator windings; a rotor having magnetic poles, the number of said magnetic poles being 2n (where n is a natural number of 2 or more), a portion of one of said magnetic poles having a magnetic property different from that of said one magnetic pole; three detection devices disposed in the vicinity of said rotor, said detection devices being responsive to a magnetic field generated by said magnetic poles and said portion; first to third amplifying means for amplifying respectively the outputs of said three detection devices; an adding means for adding the outputs of said first to third amplifying means; and a signal means for generating a pulse per one revolution of said rotor on the basis of the output of said adding means.

In a preferred embodiment, the signal means comprise a comparing means for comparing the output level of said adding means with a predetermined reference level.

In a preferred embodiment, the portion has the polarity opposite to that of said one magnetic pole.

In a preferred embodiment, the portion is not magnetized.

In a preferred embodiment, the detection devices are separated from each other by an electrical angle of 120 deg.

In a preferred embodiment, the motor further comprises: first to third subtracting means for obtaining respectively the difference of the outputs of two of said first to third amplifying means; and a driving current means for amplifying the outputs of said first to third subtracting means and supplying the amplified outputs to said stator windings.

Thus, the invention described herein makes possible the objectives of:

(1) providing a DC commutatorless motor which can generate a PG signal without using a magnet designed especially for generating a PG signal;

(2) providing a DC commutatorless motor which can generate a PG signal with using rotation detecting elements designed for detecting the rotation of the rotor;

(3) providing a DC commutatorless motor which can be produced at a low cost; and (4) providing a DC commutatorless motor which can be constructed in a small size.

BRIEF DESCRIPTION OF THE DRAWINGS

This invention may be better understood and its numerous objects and advantages will become apparent to those skilled in the art by reference to the accompanying drawings as follows:

FIG. 4 is a timing chart illustrating the operation of the embodiment of FIG. 1.

FIG. 6 is a timing chart illustrating the operation of the embodiment of FIG. 5.

DESCRIPTION OF THE PREFERRED EMBODIMENTS

Figure 1:
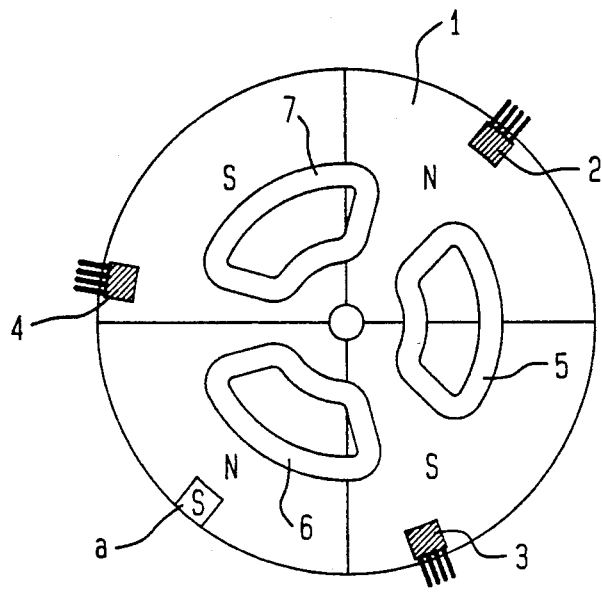
FIG. 1 illustrates a DC commutatorless motor according to the invention.
Figure 7:
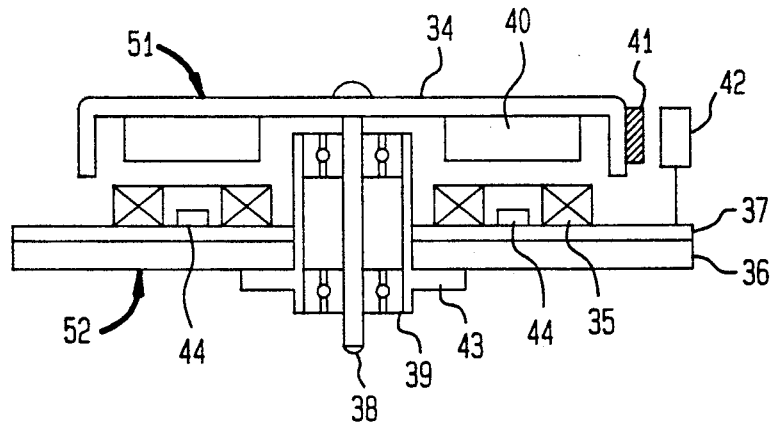
FIG. 7 is a sectional view of a conventional DC commutatorless motor.

FIG. 1 shows a mechanical structure of a DC commutatorless motor according to the invention. The motor of FIG. 1 comprises a rotor 1, three rotation detecting elements 2-4 which are arranged with a phase difference of 120 deg., and three-phase stator windings 5-7 which are arranged with a phase difference of 120 deg. In this embodiment, the rotation detecting elements 2-4 consist of Hall elements, and are disposed so as to face the periphery of the rotor 1. The strip-like area of the rotor 1 which opposes the rotation detecting elements 2-4 is referred to as "a rotation detection track". The rotor 1 comprises four magnetic pole areas (two N-poles and two S-poles) (i.e., n=2). In the rotation detection track of one of the N-pole areas, a small S-pole region a is formed.

Figure 2:
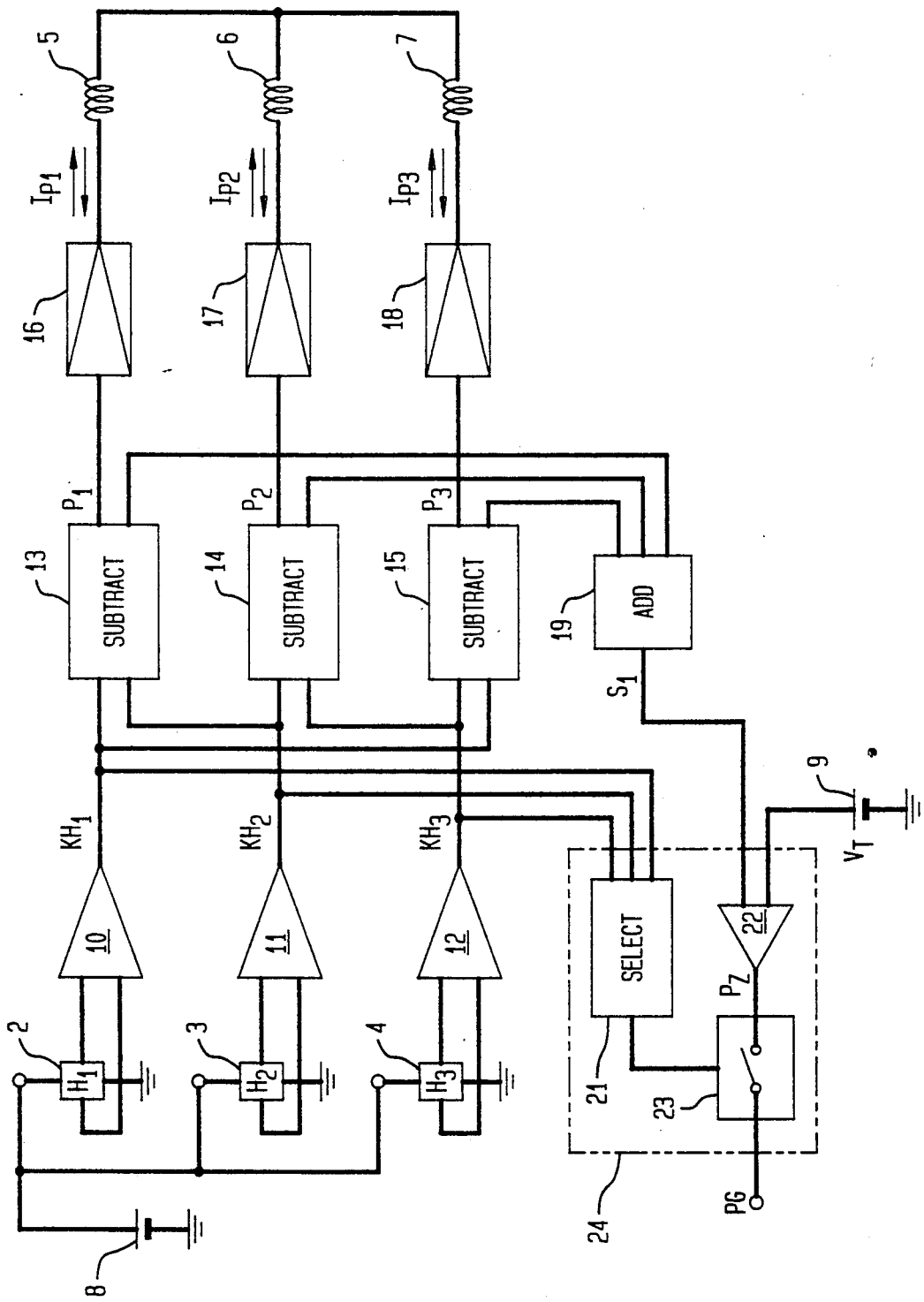
FIG. 2 is a block diagram of the embodiment of FIG. 1.

A block circuit diagram of the motor of FIG. 1 is illustrated in FIG. 2. The circuit of FIG. 2 comprises: a DC power source 8 by which the rotation detecting elements 2-4 are powered; another DC power source 9; three amplifiers 10-12 which amplify respectively the outputs $H_1$-$H_3$ of the rotation detecting elements 2-4; three subtracting circuits 13-15 connected to the amplifiers 10-12; three current drive circuits 16-18 coupled to the subtracting circuits 13-15; an absolute value adding circuit 19 coupled to the subtracting circuits 13-15; and a PG signal detection circuit 24. The subtracting circuit 13 receives the outputs of the amplifiers 10 and 11, and the subtracting circuit 14 the outputs of the amplifiers 11 and 12, and the subtracting circuit 15 the outputs of the amplifiers 10 and 12. The PG signal detection circuit 24 comprises a phase selection circuit 21 connected to the amplifiers 10-12, a comparator 22 connected to the adding circuit 19 and the DC power source 9, and an analog switch 23 connected to the phase selection circuit 21 and the comparator 22. The outputs of the current drive circuits 16-18 are supplied to the stator windings 5-7, respectively.

When the rotor 1 rotates clockwise, the rotation detecting elements 2-4 respond with the passing of the magnetic poles of the rotor 1 opposing thereto, to produce quasi-sinusoidal outputs $H_1$-$H_3$ which are shifted in phase by 120 deg. a shown in (a) of FIG. 4. When the S-pole region a passes each of the rotation detecting elements 2-4, a sharp drop appears in each of the outputs $H_1$-$H_3$. These output signals $H_1$-$H_3$ are amplified by the amplifiers 10-12 with the gain K (K is a constant), respectively. The output $K \cdot H_1$ of the amplifier 10 is supplied to the subtracting circuits 13 and 15, the output $K \cdot H_2$ of the amplifier 11 is supplied to the subtracting circuits 13 and 14, and the output $K \cdot H_3$ of the amplifier 12 is supplied to the subtracting circuits 14 and 15. The output $P_1$ ($=K \cdot H_1 - K \cdot H_2$) of the subtracting circuit 13 is supplied to the drive circuit 16. Similarly, the outputs $P_2$ ($=K \cdot H_2 - K \cdot H_3$) and $P_3$ ($=K \cdot H_3 - K \cdot H_1$) of the subtracting circuits 14 and 15 are supplied respectively to the drive circuits 17 and 18. The wave shapes of the outputs $P_1$-$P_3$ are shown in (b) of FIG. 4. The outputs $I_{P1}$-$I_{P3}$ of the driving circuits 16-18 are applied to the stator windings 5-7. The wave shapes of the outputs $I_{P1}$-$I_{P3}$ are shown in (f) to (h) of FIG. 4, respectively.

The outputs $P_1$-$P_3$ are also input to the adding circuit 19 which produces an output signal $S_1$ ($=|P_1|+|P_2|+|P_3|$). As shown in (c) of FIG. 4, the level of the output signal $S_1$ drops whenever the S-pole region a passes each of the rotation detecting elements 2-4. The signal $S_1$ is supplied to one input of the comparator 22 to be compared with the predetermined level $V_T$ of the DC power source 9. The output $P_z$ of the comparator 22 has three pulses per one revolution of the rotor 1, as shown in (d) of FIG. 4.

Figure 3:
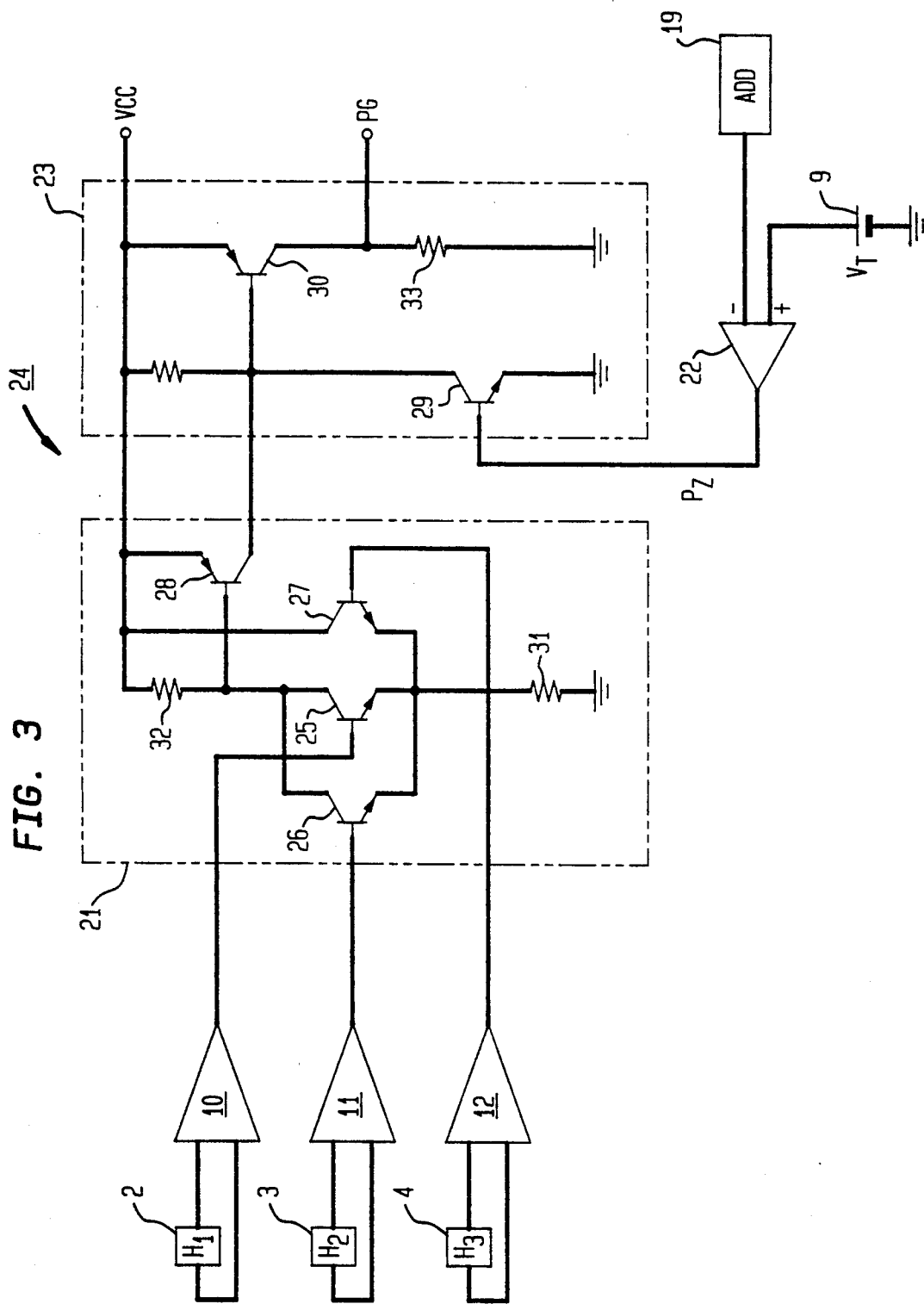
FIG. 3 is a block diagram of one portion of the embodiment of FIG. 1.

As shown in FIG. 3, the phase selection circuit 21 comprises transistors 25-28 and resistors 31 and 32. The outputs of the amplifiers 10-12 are respectively applied to the bases of the transistors 25-27 to compare the levels of the outputs $H_1$-$H_3$ of the rotation detecting elements 2-4. The analog switch 23 comprises transistors 29 and 30 and a resistor 33. When the output $H_3$ of the rotation detecting element 4 is smaller than both the outputs $H_1$ and $H_2$ of the other rotation detecting elements 2 and 3 (in the range of 0 deg. to 240 deg.), the transistor 28 is turned on so that the analog switch 23 is deactivated to inhibit the output $P_z$ of the comparator 22 from passing through. When the output $H_3$ is greater than the output $H_1$ or $H_2$ (in the range of 240 deg. to 360 deg.), in contrast, the transistor 28 is turned off so that the analog switch 23 is activated to allow the output $P_z$ of the comparator 22 to pass through. Therefore, the output from the analog switch 23 produces one pulse signal per one revolution of the rotor 1 as shown in (e) of FIG. 4, and can be used as a PG signal.

Figure 5:
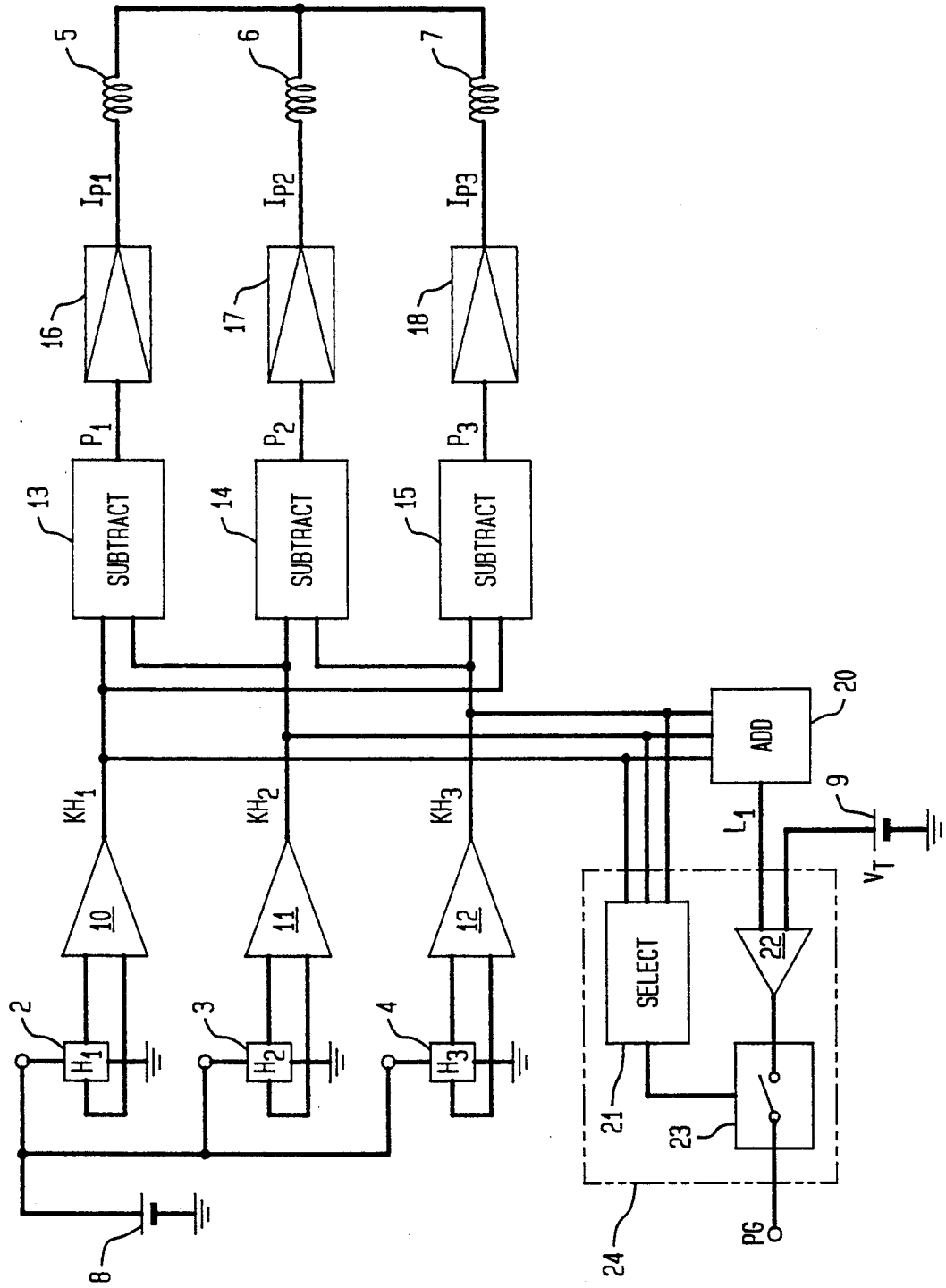
FIG. 5 is a block diagram of another DC commutatorless motor according to the invention.

FIG. 5 shows a block circuit diagram of another DC commutatorless motor according to the invention. The embodiment of FIG. 5 has a configuration similar to that of the embodiment of FIG. 2 except that an adding circuit 20 connected to the amplifiers 10-12 is used instead of the absolute value adding circuit 19. In a manner similar to the above-described embodiment, signals $H_1$-$H_3$ ((a) of FIG. 6) are output from the amplifiers 10-12. These signals are supplied to the stator windings 5-7 as the driving currents $I_{P1}$-$I_{P3}$ ((e) to (g) of FIG. 6) through the subtracting circuits 13-15 and the driving circuits 16-18, and also supplied to the adding circuit 20. The adding circuit 20 generates a signal $L_1$ which drops thrice during one revolution of the rotor as shown in (c) of FIG. 6. The signal $L_1$ is compared with the voltage $V_T$ in the comparator 22, and the analog switch 23 outputs one PG signal ((d) of FIG. 6) for one revolution of the rotor, in accordance with the output of the phase selection circuit 21.

As seen from above, according to the invention, one PG signal can be obtained for every revolution of the rotor on the basis of signals generated by rotation detection elements, which are installed for generating three-phase distribution signals, and without using a magnet designed especially for the generation of a PG signal. Hence, in a DC commutatorless motor of the invention, it is not required to install a PG magnet and a magnetic sensor associated therewith, resulting in a reduced number of components and reduced production steps.

In the above-described embodiments, the detection devices (the elements 2–4) are arranged in a phase difference of 120 deg. It is apparent for those skilled in the art that the same effect as that accomplished by these embodiments can be achieved when detection devices are arranged in a phase difference of $120 \times k/n$ deg. (where k is a natural number other than a multiple of 3) in a commutatorless motor having 2n magnetic poles (where n is a natural number larger than 3). The S-pole region a in the embodiments may be replaced by a region which is not magnetized.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A DC commutatorless motor comprising:
   three-phase stator windings;
   a rotor having magnetic poles, the number of said magnetic poles being 2n (where n is a natural number of 2 or more), one of said magnetic poles comprising a first region of one magnetic polarization and a second region within said first region, wherein said second region is oppositely magnetically polarized to said first region;
   three detection devices disposed in the vicinity of said rotor, said detection devices being responsive to a magnetic field generated by said magnetic poles and said portion;
   first to third amplifying means for amplifying respectively the outputs of said three detection devices;
   first to third subtracting means for obtaining respectively the difference of the outputs of two of said first to third amplifying means;
   an adding means for adding the outputs of said first to third subtracting means; and
   a signal means for generating a pulse per one revolution of said rotor on the basis of the output of said adding means.

2. A motor according to claim 1 wherein said signal means comprise a comparing means for comparing the output level of said adding means with a predetermined reference level.

3. A motor according to claim 1 wherein said detection devices are separated from each other by an electrical angle of 120 deg.

4. A motor according to claim 3 wherein said motor further comprises a driving current means for amplifying the outputs of said first to third subtracting means and supplying the amplified outputs to said stator windings.

5. A DC commutatorless motor comprising:
   three-phase stator windings;
   a rotor having magnetic poles, the number of said magnetic poles being 2n (where n is a natural number of 2 or more), one of said magnetic poles comprising a first region of one of magnetic polarization and a second region within said first region, wherein said second region is not magnetized;
   three detection devices disposed in the vicinity of said rotor, said detection devices being responsive to a magnetic field generated by said magnetic poles and said portion;
   first to third amplifying means for amplifying respectively the outputs of said three detection devices;
   first to third subtracting means for obtaining respectively the difference of the outputs of two of said first to third amplifying means;
   an adding means for adding the outputs of said first to third subtracting means; and
   a signal means for generating a pulse per one revolution of said rotor on the basis of the output of said adding means.

6. A DC commutatorless motor comprising:
   three-phase stator windings;
   a rotor having magnetic poles, the number of said magnetic poles being 2n (where n is a natural number of 2 or more), one of said magnetic poles comprising a first region of one magnetic polarization and a second region within said first region, wherein said second region is oppositely magnetically polarized to said first region;
   three detection devices disposed in the vicinity of said rotor, said detection devices being responsive to a magnetic field generated by said magnetic poles and said portion;
   first to third amplifying means for amplifying respectively the outputs of said three detection devices;
   an adding means for adding the outputs of said first to third amplifying means; and
   a signal means for generating a pulse per one revolution of said rotor on the basis of the output of said adding means.

7. A motor according to claim 6 wherein said signal means comprise a comparing means for comparing the output level of said adding means with a predetermined reference level.

8. A motor according to claim 6 wherein said detection devices are separated from each other by an electrical angle of 120 deg.

9. A motor according to claim 8 wherein said motor further comprises:
   first to third subtracting means for obtaining respectively the difference of the outputs of two of said first to third amplifying means; and
   a driving current means for amplifying the outputs of said first to third subtracting means and supplying the amplified outputs to said stator windings.

10. A DC commutatorless motor comprising:
    three-phase stator windings;
    a rotor having magnetic poles, the number of said magnetic poles being 2n (where n is a natural number of 2 or more), one of said magnetic poles comprising a first region of one of magnetic polarization and a second region within said first region, wherein said second region is not magnetized;

three detection devices disposed in the vicinity of said rotor, said detection devices being responsive to a magnetic field generated by said magnetic poles and said portion;

first to third amplifying means for amplifying respectively the outputs of said three detection devices;

an adding means for adding the outputs of said first to third amplifying means; and a signal means for generating a pulse per one revolution of said rotor on the basis of the output of said adding means.

11. A DC commutatorless motor comprising:

three-phase stator windings;

a rotor having a number of magnetic poles, wherein the number of said magnetic poles is two times a natural number of 2 or greater, wherein one of said magnetic poles comprises a first region of a magnetic polarization and a second region within said first region, wherein said second region is oppositely magnetically polarized to said first region;

three detection devices disposed in the vicinity of said rotor, said detection devices being responsive to a magnetic field generated by said magnetic poles;

first to third amplifying means for amplifying respectively the outputs of said three detection devices;

first to third subtracting means for obtaining respectively the difference of the outputs of two of said first to third amplifying means;

adding means for adding the outputs of said first to third subtracting means; and signal means for generating a pulse per one revolution of said rotor on the basis of the output of said adding means.

12. A DC commutatorless motor comprising:

three-phase stator windings;

a rotor having a number of magnetic poles, wherein the number of said magnetic poles is two times a natural number of 2 or greater, wherein one of said magnetic poles comprises a first region of a magnetic polarization and a second non-magnetized region within said first region;

three detection devices disposed in the vicinity of said rotor, said detection devices being responsive to a magnetic field generated by said magnetic poles;

first to third amplifying means for amplifying respectively the outputs of said three detection devices;

first to third subtracting means for obtaining respectively the difference of the outputs of two of said first to third amplifying means;

adding means for adding the outputs of said first to third subtracting means; and signal means for generating a pulse per one revolution of said rotor on the basis of the output of said adding means.

13. A DC commutatorless motor comprising:

three-phase stator windings;

a rotor having a number of magnetic poles, wherein the number of said magnetic poles is two times a natural number of 2 or greater, wherein one of said magnetic poles comprises a first region of a magnetic polarization and a second region within said fist region, wherein said second region is oppositely magnetically polarized to said first region;

three detection devices disposed in the vicinity of said rotor, said detection devices being responsive to a magnetic field generated by said magnetic poles;

first to third amplifying means for amplifying respectively the outputs of said three detection devices;

adding means for adding the outputs of said first to third amplifying means; and signal means for generating a pulse per one revolution of said rotor on the basis of the output of said adding means.

14. A DC commutatorless motor comprising:

three-phase stator windings;

a rotor having a number of magnetic poles, wherein the number of said magnetic poles is two times a natural number of 2 or greater, wherein one of said magnetic poles comprises a first region of a magnetic polarization and a second non-magnetized region within said first region;

three detection devices disposed in the vicinity of said rotor, said detection devices being responsive to a magnetic field generated by said magnetic poles;

first to third amplifying means for amplifying respectively the outputs of said three detection devices;

adding means for adding the outputs of said first to third amplifying means; and signal means for generating a pulse per one revolution of said rotor on the basis of the output of said adding means.

* * * * *

UNITED STATES PATENT AND TRADEMARK OFFICE
CERTIFICATE OF CORRECTION

PATENT NO. : 5,291,104
DATED : March 1, 1994
INVENTOR(S) : Yasuhiro Okada et al.

It is certified that error appears in the above-identified patent and that said Letters Patent is hereby corrected as shown below:

column 3, line 21, change "Figure 4 is a" to --Figures 4A - 4H are--.

Column 3, line 21, "chart" should be changed to --charts--.

Column 3, line 25, "Figure 6 is a timing chart" should be changed to --Figures 6A - 6G are timing charts--.

Column 4, line 5, delete "(a)".

Column 4, line 5, change "of Figure 4" to --Figure 4A--.

Column 4, line 20, delete "(b) of".

Column 4, line 20, change "Figure 4" to --Figure 4B--.

Column 4, line 23, change "(f) to (h) of Figure 4" to --Figures 4F to 4H--.

Column 4, line 27, change "(c) of Figure 4" to --Figure 4C--.

Column 4, line 34, change "(d) of Figure 4" to --Figure 4D--.

Column 4, line 53, delete "(e) of".

UNITED STATES PATENT AND TRADEMARK OFFICE
CERTIFICATE OF CORRECTION

PATENT NO.    : 5,291,104
DATED         : March 1, 1994
INVENTOR(S)   : Yasuhiro Okada et al.

It is certified that error appears in the above-identified patent and that said Letters Patent is hereby corrected as shown below:

Column 4, line 54, change "Figure 4" to --Figure 4E--.

Column 4, line 62, delete "(a) of".

Column 4, line 62, change "Figure 6" to --Figure 6A--.

Column 4, line 64, change "(e) to (g) of" to --Figures 6E to 6G--.

Column 4, line 65, delete "Figure 6".

Column 5, line 1, change "(c) of Figure 6" to --Figure 6C--.

Column 5, line 3, delete "(d) of"

Column 5, line 3, change "Figure 6" to --Figure 6D--.

Signed and Sealed this

Eleventh Day of October, 1994

Attest:

BRUCE LEHMAN

*Attesting Officer*    *Commissioner of Patents and Trademarks*